I. R. KERN.
Steam Boiler.
No. 233,102.  Patented Oct. 12, 1880.
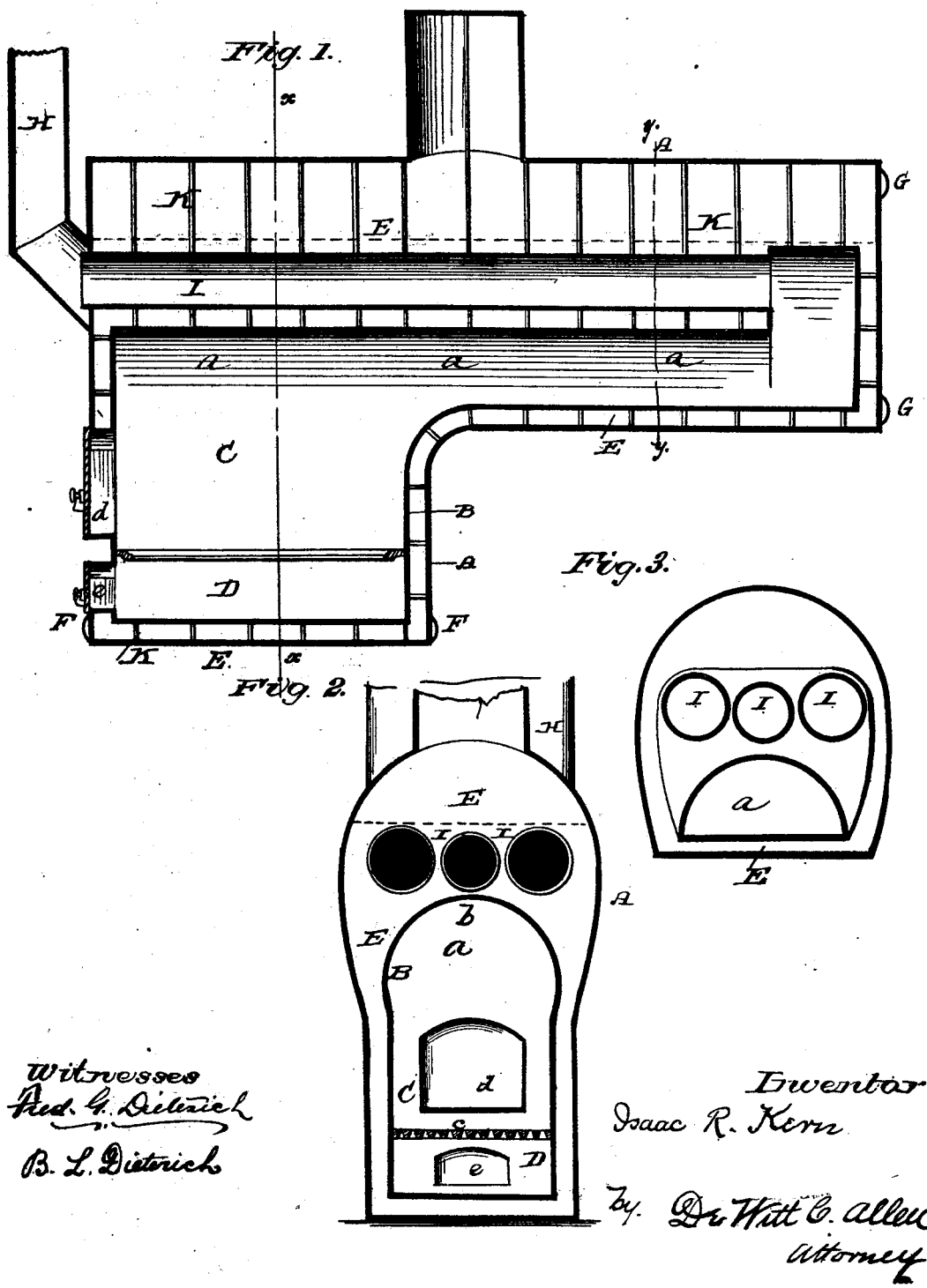

UNITED STATES PATENT OFFICE.

ISAAC R. KERN, OF KANSAS CITY, MISSOURI.

STEAM-BOILER.

SPECIFICATION forming part of Letters Patent No. 233,102, dated October 12, 1880.

Application filed February 5, 1880.

*To all whom it may concern:*

Be it known that I, ISAAC R. KERN, a citizen of the United States, residing at Kansas City, in the county of Jackson and State of Missouri, have invented certain new and useful Improvements in Steam-Boilers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the accompanying drawings, Figure 1 represents a longitudinal vertical section of my improved boiler; Fig. 2, a transverse vertical section through the line $x\ x$ of Fig. 1; Fig. 3, a transverse section through the line $y\ y$ of Fig. 1.

My invention relates to certain new and useful improvements in the class of steam-boilers having double walls forming a water-space around the furnace or fire-box and ash-pit, with return-flues passing through the upper portion of boiler for obtaining greater heating-surface, while economizing in the cost of fuel.

The object of my invention is to permit in such class of boilers the collection and burning of all the gases, instead of passing immediately through the flues and escaping from the smoke-stack or uptake, thus further and materially economizing in the cost of fuel, and also preventing sediments collecting in the water-space over the fire, thereby preventing the iron of the boiler from burning and facilitating evaporation of the water therein; and to this end the invention consists in the general construction, combination, and arrangement of parts, all as will be hereinafter fully described, and specifically pointed out in the claim.

To enable others skilled in the art to which my invention is most nearly connected to make and use the same, I will now proceed to describe its construction and operation.

In the drawings, A represents the outer, and B the inner, walls of the boiler, which extend downward around the furnace or fire-box C and ash-pit D, located at one end of the boiler, thus forming a water-space, E, around the furnace or fire-box and ash-pit. $c$ represents the grate, and $d\ e$ doors communicating with the furnace or fire-box and ash-pit. F represents hand-holes, and G man-holes communicating with the interior of the boiler, and I return flues or tubes passing nearly through the upper portion of the boiler and communicating with the usual uptake or smoke-stack H.

The furnace or fire-box, ash-pit, and return flues or tubes are entirely surrounded by water, the water-line being shown by dotted lines in Fig. 1.

K represents stay-bolts in sufficient numbers to thoroughly brace the walls A B of the boiler.

The surface $b$ of the crown-sheet of the boiler, over the furnace or fire-box, is made concave, so that the sediments contained in the water will not collect thereon, but will pass down the side walls into the space under the ash-pit, thus obviating any collection of sediment over the fire, which causes the iron to burn and prevents the heat from penetrating to the water, as is the case usually when the crown-sheet is flat.

The double side walls of the furnace or fire-box are made straight for a considerable distance above the grate, and are then extended outward at their upper ends in connection with the extended portion of the boiler, and terminate in a concave crown-sheet over the fire-box or furnace, and the extended portion of the boiler forming an enlarged or expansible space, $a$, the entire length of the boiler, for the expansion of the combustible gases, whereby they are collected and retained in said space and burned by the flames of the furnace, instead of passing immediately through the flues or tubes and escaping out of the uptake or smoke-stack, thereby materially economizing in fuel, which is considerable, and more especially when soft coal is used.

It will be observed that the outer and inner walls have no joints at the point where they extend down and around the furnace or fire-box and ash-pit, thus economizing in the cost of construction and making the boiler more durable and stronger.

By my improved construction of boiler an increased amount of steam can be obtained from the same amount of fuel, owing to the fact that the enlarged space $a$ gives a greater area of heating-surface, while the entire heating-surface is surrounded by water, which thereby receives a great portion of the heat generated by combustion of the fuel and the combustible gases.

I am aware that steam-boilers having a water-space surrounding the furnace or fire-box and ash-pit, and return-flues passing through the boiler, and also a crown-sheet for fire-boxes having straight side walls at their lower portions and the upper portion of said walls extended outward, forming an enlarged space above the fire-grate, are old, and such I do not wish to be understood as claiming, broadly, as of my invention; but,

Having thus fully described my invention, what I claim as new, and desire to secure by Letters Patent, is—

The herein-described steam-boiler, consisting of the outer and inner walls, A B, made without joints, and extending vertically down around the furnace or fire-box and ash-pit, forming a surrounding water-space, E, and said walls extended outward above the furnace or fire-box and continued the entire length of the boiler, forming a greater area of heating-surface and an enlarged space, $a$, for collecting and retarding the products of combustion, and the return-flues I, arranged in the upper portion of the boiler, substantially as and for the purpose specified.

In testimony whereof I affix my signature in presence of two witnesses.

ISAAC B. KERN.

Witnesses:
 JOHN W. BEEBE,
 W. J. STRONG.